(12) United States Patent
Augustynowicz et al.

(10) Patent No.: US 6,967,051 B1
(45) Date of Patent: Nov. 22, 2005

(54) THERMAL INSULATION SYSTEMS

(75) Inventors: Stanislaw D. Augustynowicz, Titusvile, FL (US); James E. Fesmire, Titusville, FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 18 days.

(21) Appl. No.: 09/939,286

(22) Filed: Aug. 20, 2001

Related U.S. Application Data

(63) Continuation of application No. 09/302,315, filed on Apr. 29, 1999, now abandoned.

(51) Int. Cl.[7] ............................. B32B 9/00; B32B 3/02
(52) U.S. Cl. ........................... 428/68; 428/69; 428/75; 428/76; 220/560.12; 220/650.13
(58) Field of Search ............................ 428/68, 69, 75, 428/76; 220/560.12, 560.13, 592.09, 592.11, 220/592.2, 592.21, 592.24, 592.26, 592.27

(56) References Cited

U.S. PATENT DOCUMENTS

| | | | |
|---|---|---|---|
| 2,396,459 A | 3/1946 | Dana ................................ 62/1 |
| 2,552,641 A | 5/1951 | Morison ........................ 220/9 |
| 2,643,022 A | 6/1953 | Cornell ........................ 220/15 |
| 3,007,596 A | 11/1961 | Matsch ........................... 220/9 |
| 3,930,375 A | 1/1976 | Hofmann ........................ 62/45 |
| 3,993,213 A | 11/1976 | Burge et al. .................... 220/9 |
| 4,269,323 A | 5/1981 | Ito et al. ...................... 220/423 |
| 4,304,824 A * | 12/1981 | Karpinski ..................... 428/69 |
| 4,564,547 A | 1/1986 | Hughes ........................ 428/117 |
| 4,636,415 A * | 1/1987 | Barito et al. .................. 428/68 |
| 4,657,614 A | 4/1987 | Andersson ............. 156/244.11 |
| 4,777,086 A | 10/1988 | Madden et al. ............. 428/285 |
| 4,878,258 A * | 11/1989 | Casey ............................ 5/420 |
| 4,945,714 A | 8/1990 | Bodolay et al. .............. 53/568 |
| 5,014,494 A | 5/1991 | George ........................ 53/425 |
| 5,082,335 A * | 1/1992 | Cur et al. .................... 312/401 |
| 5,160,769 A | 11/1992 | Garrett ....................... 428/36.5 |
| 5,246,759 A | 9/1993 | Keller ......................... 428/74 |
| 5,271,980 A * | 12/1993 | Bell ............................. 428/68 |
| 5,417,789 A | 5/1995 | Lauritzen .................... 156/220 |
| 5,500,175 A | 3/1996 | Bradt ......................... 264/151 |
| 5,542,255 A | 8/1996 | Preston et al. ............... 62/45.1 |
| 5,716,472 A | 2/1998 | Rossetti ...................... 156/164 |
| 5,749,537 A | 5/1998 | Muzio, Jr. et al. ....... 242/439.5 |
| 6,221,456 B1 * | 4/2001 | Pogorski et al. ............. 428/69 |

* cited by examiner

*Primary Examiner*—Alicia Chevalier
(74) *Attorney, Agent, or Firm*—Randall M. Heald; Gary G. Borda; Guy Miller

(57) ABSTRACT

Thermal insulation systems and with methods of their production. The thermal insulation systems incorporate at least one reflection layer and at least one spacer layer in an alternating pattern. Each spacer layer includes a fill layer and a carrier layer. The fill layer may be separate from the carrier layer, or it may be a part of the carrier layer, i.e., mechanically injected into the carrier layer or chemically formed in the carrier layer. Fill layers contain a powder having a high surface area and low bulk density. Movement of powder within a fill layer is restricted by electrostatic effects with the reflection layer combined with the presence of a carrier layer, or by containing the powder in the carrier layer. The powder in the spacer layer may be compressed from its bulk density. The thermal insulation systems may further contain an outer casing. Thermal insulation systems may further include strips and seams to form a matrix of sections. Such sections serve to limit loss of powder from a fill layer to a single section and reduce heat losses along the reflection layer.

13 Claims, 6 Drawing Sheets

THERMAL INSULATION SYSTEMS

This application is a continuation of application Ser. No. 09/302,315, filed Apr. 29, 1999, now abandoned.

TECHNICAL FIELD

The present invention relates generally to thermal insulation and in particular to systems, methods of use and methods of fabrication for thermal insulation of apparatus in soft vacuum.

BACKGROUND

It is often necessary or desirable to limit heat transfer from an object to its surroundings. Heat transfer is the transfer of energy resulting from a temperature differential between the object and its surroundings. Heat transfer occurs through three fundamental mechanisms: radiation, conduction (solid and gas) and convection.

Conduction generally involves the transfer of energy of motion between adjacent molecules, such as vibration of atoms in a crystal lattice or random motion of molecules in a gas. As such, conduction requires physical contact to effect heat transfer. Steady-state conduction in solids is generally represented by Fourier's equation:

$$q=-kAdt/dx$$

where:
- q=heat-conduction rate in the x direction
- A=cross-sectional area normal to heat flow
- dt/dx=temperature gradient in the x direction
- k=thermal conductivity of the conducting medium The thermal conductivity, k, is a function of the molecular state of the conducting medium. Accordingly, it is generally considered to be dependent upon temperature and pressure. Lower values of k result in a reduction in heat transfer. Heat transfer occurs in the direction of decreasing temperature.

From the kinetic theory of gases, the energy transfer rate by conduction through gases, or molecular conduction, can be determined as:

$$q=GPA_1(t_2-t_1)$$

where:
- $G=[(\gamma+1)/(\gamma-1)](g_c R/8\pi T)^{1/2} F_a$
- R=specific gas constant
- $F_a$=accommodation coefficient factor
- P=absolute pressure
- $t_1$=temperature of the absorbing surface
- $t_2$=temperature of the conducting surface
- T=temperature of the gas separating the conducting and absorbing surfaces
- $A_1$=cross-sectional area of the absorbing surface normal to heat flow In reference to the above function for gas conduction, the mean free path, $\lambda$, must be larger than the spacing of the absorbing and conducting surfaces, where:

$$\lambda=(\mu/P)(\pi RT/2g_c)^{1/2}$$

where: $\mu$=gas viscosity

Convection involves the transfer of heat due to bulk transport and mixing of macroscopic elements of a fluid. Convection is thus more complicated than conduction as fluid dynamics play a significant factor in the rate of heat transfer. Steady-state convective heat transfer may be simplified to an equation of the form:

$$q=hA(t_s-t_m)$$

where:
- q=heat-transfer in the direction of decreasing temperature
- h=convective heat-transfer coefficient
- A=cross-sectional area normal to heat flow
- $t_s$=surface temperature of the conducting object
- $t_m$=temperature of the surrounding fluid medium some distance from the object surface The heat-transfer coefficient, h, is a function of the properties of the fluid, the geometry and surface characteristics of the object surface, and the flow pattern of the fluid. Convection can by induced by density differences within the fluid medium, i.e., natural convection, or motion may be the result of external forces, i.e., forced convection. Because convective heat transfer relies on transport within a fluid medium, this component can often be ignored at pressures below about 50 torr.

Radiation is the transfer of heat by electromagnetic radiation, or photons. Radiation transfer is dependent upon the absorptivity, emissivity and reflectivity of the body radiating energy, i.e., the source, and the body at which the radiation impinges, i.e., the sink. Steady-state radiation heat transfer may be simplified to an equation of the form:

$$q=h_r A_{s2}(t_{s1}^4-t_{s2}^4)$$

where:
- q=heat-transfer in the direction of decreasing temperature
- $h_r$=radiation heat-transfer coefficient
- A=cross-sectional area of the sink object normal to the radiation
- $t_{s1}$=surface temperature of the source object
- $t_{s2}$=surface temperature of the sink object and: $h_r=F_e F_{2\to 1}\sigma$ where:
- $F_e$=emissivity factor
- $F_{2\to 1}$=configuration factor
- $\sigma$=Stefan-Boltzman constant There is a strong dependence of the heat-transfer coefficient, $h_r$, on temperature as an object's radiation, and thus the heat transfer medium, will depend largely on its temperature. Although radiation transfer may occur through gases, liquids or solids, these media will absorb or reflect some or all of the energy. Accordingly, radiation transfer occurs most efficiently through an empty, vacuous space.

One common thermal insulation used in cryogenic and aerospace applications is known as Multilayer Insulation (MLI), or Superinsulation. The development of MLI around 1960 was spurred on by the space program and generally contains multiple layers of reflective material separated by spacers having low conductivity.

Ideal MLI consists of many radiation shields stacked in parallel as close as possible without touching. Low thermal conductivity spacers are employed between the layers to keep the highly conductive shields from touching one another. MLI will typically contain on the order of 50 layers per inch. MLI is thus anisotropic by nature, making it difficult to apply to complex geometries. MLI is generally very sensitive to mechanical compression and edge effects, requiring careful attention to details during all phases of installation. Accordingly, performance in practice, even under laboratory conditions, is often several times worse than ideal.

In addition, MLI is designed to work under high vacuum levels, i.e., below about $1\times10^{-4}$ torr. Not only does this require lengthy evacuation, purging and heating cycles to obtain such high vacuum levels for proper performance, but such systems require either dedicated pumping systems or adsorbents and chemical gettering packs to maintain their high vacuum. Furthermore, performance of MLI degrades rapidly upon loss of such high vacuum levels.

Another common insulation is foam insulation. Foam insulation requires no vacuum. Foams generally have reduced thermal conductivity given their relatively low densities. Furthermore, foams inhibit convective heat transfer by limiting convection to the individual cells, fissures or other spaces within the foam structure. Foam insulation generally includes some form of moisture barrier as moisture accumulation within the spaces of the foam structure will rapidly increase the thermal conductivity of the foam. Typical foam structures include polyurethane foam, polyimide foam and foam glass.

Foam insulation is generally not favored in cryogenic applications. Such insulation is prone to cracking due to thermal cycling and environmental exposure. Cracks permit incursion of moisture and humid air, which will form ice and greatly increase the surface area for heat transfer.

Other insulation systems useful in cryogenic applications include evacuated annular spaces having bulk-filled materials, e.g., glass fiber, silica aerogel or composites. As with MLI, these systems require high vacuum levels of around $1\times10^{-3}$ torr. Additional insulation systems are well known in the art.

Cryogenic insulation system performance is often reported for large temperature differences in terms of an apparent thermal conductivity, or k value. Boundary temperatures of 77K (liquid nitrogen) and 290K (room temperature) are common. Unless otherwise noted, k values discussed herein apply generally to these boundary conditions.

MLI systems can produce k values of below 0.1 mW/m-K (R-value of approximately 1440) when properly operating at cold vacuum pressure (CVP) below about $1\times10^{-4}$ torr. For bulk-filled insulation systems operating at CVP below about $1\times10^{-3}$ torr, k values of about 2 mW/1-K (R-value of approximately 72) may be typical. Foam and similar materials at ambient pressures typically may produce k values of about 30 (R-value of approximately 4.8). It should be noted that a k value of 1 mW/m-K is equivalent to an R-value of 144.2. R-value is a standard industry unit of thermal resistance for comparing insulating values of different materials. It is a measure of a material's resistance to heat flow in units of $°F.\text{-hr-ft}^2/\text{BTU-in}$. All values given as typical above represent one inch of insulation of the type described.

Insulation systems are known which have low thermal conductivities at high vacuum conditions, but their performance degrades precipitously as pressure is increased above $1\times10^{-3}$ torr. Other insulation systems are capable of operating at ambient pressure, but do not exhibit sufficiently low thermal conductivity for most cryogenic applications and are difficult to protect against moisture and air intrusion. Accordingly, there is a need in the art for systems of thermal insulation having reasonably low thermal conductivity across a wide range of pressure and temperature conditions.

SUMMARY

In one embodiment, the invention provides a thermal insulation system. The thermal insulation system includes at least one insulating layer. Each of the at least one insulating layers includes a reflection layer, having a first surface and a second surface, and a spacer layer adjacent the first surface of the reflection layer. The spacer layer contains powder having a surface area of approximately 10 to 1,100 $m^2/g$. In another embodiment, the thermal insulation system includes an outer casing surrounding the at least one insulating layer.

In a further embodiment, the invention provides a thermal insulation system. The thermal insulation system includes at least one insulating layer. Each of the at least one insulating layers includes a reflection layer, having a first surface and a second surface, a carrier layer, and a fill layer adjacent the first surface of the reflection layer and interposed between the carrier layer and the reflection layer. The fill layer contains powder having a surface area of approximately 10 to 1,100 $m^2/g$. The thermal insulation system further includes at least one edge strip adjacent the fill layer and interposed between the carrier layer and the reflection layer. In a still further embodiment, the thermal insulation system includes at least one intermediate strip interposed between the carrier layer and the reflection layer, wherein the at least one intermediate strip separates sections of the fill layer. In yet another embodiment, the thermal insulation system includes an outer casing surrounding the at least one insulating layer.

In another embodiment, the invention provides a method of insulating an object. The method includes applying an inventive thermal insulation system to the object and applying an operating pressure to the thermal insulation system, wherein the operating pressure is below about 760 torr, or ambient pressure. In yet another embodiment, the operating pressure is below about 50 torr. In still another embodiment, the operating pressure is between about 1 torr to 10 torr.

In a further embodiment, the invention provides a method of insulating an object. The method includes applying an inventive thermal insulation system to the object and applying an operating pressure to the thermal insulation system, wherein the operating pressure is below about 760 torr. In yet another embodiment, the operating pressure is below about 50 torr. In still another embodiment, the operating pressure is between about 1 torr to 10 torr.

In one embodiment, the invention provides a method of fabricating a thermal insulation system. The method includes distributing a powder having a surface area of approximately 10 to 1,100 $m^2/g$ across a first surface of a reflection layer at an application rate, thereby producing a fill layer adjacent the first surface of the reflection layer. The method further includes applying a carrier layer on the fill layer, thereby producing a spacer layer comprising the carrier layer and the fill layer. The method still further includes compressing the combination of the reflection layer and spacer layer such that the powder has a compressed density of approximately 1 to 10 times a bulk density of the powder. The application rate of the powder is sufficient to produce a thickness of the spacer layer of approximately 0.002 to 0.20 inches subsequent to compressing the combination of the reflection layer and spacer layer. In another embodiment, the method further includes producing additional spacer layers on additional reflection layers prior to compressing to produce a plurality of insulating layers. In yet another embodiment, the method further includes applying an outer casing on the spacer layer prior to compressing the combination of the reflection layer and spacer layer, wrapping the outer casing around the reflection layer and spacer layer, and seaming the outer casing.

In another embodiment, the invention provides a method of fabricating a thermal insulation system. The method includes distributing a powder having a surface area of approximately 10 to 1,100 m$^2$/g across a first surface of a reflection layer at a first application rate, thereby producing a fill layer adjacent the first surface of the reflection layer. The method further includes removing powder from the fill layer, such that remaining powder has a second application rate. The method further includes applying a carrier layer on the fill layer, thereby forming a spacer layer comprising the carrier layer and the fill layer. The method still further includes compressing the combination of the reflection layer and spacer layer such that the powder has a compressed density of approximately 1 to 10 times a bulk density of the powder. The second application rate of the powder is sufficient to produce a thickness of the spacer layer of approximately 0.002 to 0.20 inches subsequent to compressing the combination of the reflection layer and spacer layer. In another embodiment, the method further includes producing additional spacer layers on additional reflection layers prior to compressing to produce a plurality of insulating layers. In yet another embodiment, the method further includes applying an outer casing on the spacer layer prior to compressing the combination of the reflection layer and spacer layer, wrapping the outer casing around the reflection layer and spacer layer, and seaming the outer casing.

DESCRIPTION OF THE EMBODIMENTS

In the following detailed description of the preferred embodiments, reference is made to the accompanying drawings which form a part hereof, and in which is shown by way of illustration specific embodiments in which the inventions may be practiced. These embodiments are described in sufficient detail to enable those skilled in the art to practice the invention, and it is to be understood that other embodiments may be utilized and that process or mechanical changes may be made without departing from the scope of the present invention. The following detailed description is, therefore, not to be taken in a limiting sense, and the scope of the present invention is defined only by the appended claims.

Figure 1:
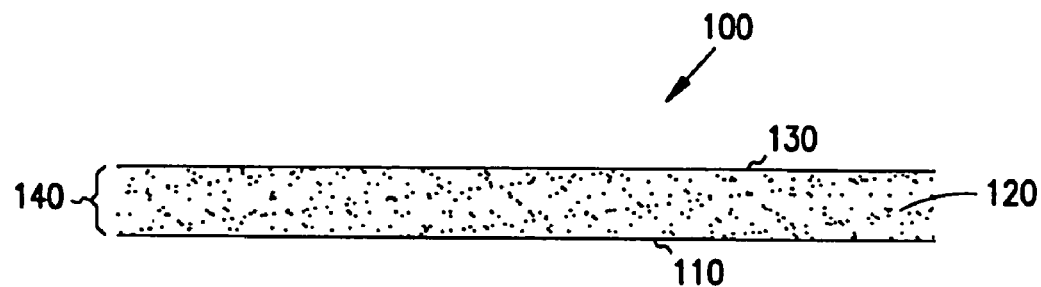
FIG. 1 is a thermal insulation system in accordance with one embodiment of the invention.

With reference to FIG. 1, one embodiment of the invention includes a thermal insulation system 100. Thermal insulation system 100 includes a reflection layer 110, a fill layer 120 and a carrier layer 130. Fill layer 120 and carrier layer 130 collectively form a spacer layer 140. Reflection layer 110 and spacer layer 140 collectively form an insulating layer.

Insulating layers are flexible such that thermal insulation systems containing such insulating layers may be applied and conformed to three-dimensional surfaces of objects to be insulated, or preformed into a variety of formats (see, e.g., FIG. 8D) to simplify installation. Stiffeners may be added to one or more insulating layers or the thermal insulation system to provide rigidity as desired, but the flexibility of the insulating layer is determined based only on the reflection layer and spacer layer.

Thermal insulation systems of the invention are preferably utilized in systems or environments which maintain the thermal insulation system at an operating pressure below approximately 760 torr during use, and preferably less than about 50 torr. Thermal insulation systems of the invention, unlike many other insulation systems, maintain excellent to moderate performance characteristics over a wide range of operating pressures, thus allowing MLI-like performance at MLI design parameters, yet reducing the risk of catastrophic heat loss in the event of loss of vacuum.

Spacer layer 140 has a thickness of approximately 0.05 inches, separating reflection layer 110 from carrier layer 130. Although other thicknesses of spacer layer 140 may be utilized, this thickness has notable advantages. The thickness of spacer layer 140 is sufficiently large to reduce the risk of heat leak due to edge effects, joint effects and compression effects, as well as other mechanical damage. Such losses are common with the close proximity of layers of MLI. Further, it is sufficiently small to provide good radiation shielding while suppressing gas conduction. Other typical values may range from approximately 0.002 inches to 0.20 inches. Typical values may further include the range of approximately 0.05 inches to 0.10 inches.

Reflection layer 110 is preferably metal foil or metalized film Examples include aluminum foil, gold foil and aluminized or double aluminized Mylar® film (Mylar® is a trademark of E.I. Du Pont De Nemours and Company, Delaware, USA, for polyester films). Such foils or films generally have one surface having a lower reflectivity, or rougher surface characteristics, than the other surface. The surface having the lower reflectivity will be termed the dull surface. Reflection layer 110 will typically have a thickness of approximately ¼ to 10 mils. Thickness values of ¼ to 1 mil are common for metal foils while values of 1 to 10 mils are common for metalized films. While greater thickness may be utilized, it is generally preferred to minimize the thickness of reflection layer 110 given its relatively high thermal conductivity compared to other component layers.

Fill layer 120 contains powder. The powder is a material having a high surface area. Preferably, the surface area of the powder is greater than approximately 100 m$^2$/g of powder. Powders having a surface area of 10 to 1,100 m$^2$/g are of specific interest. The powder is preferably a silica, and more preferably fumed silica or silica aerogel. Hydrophobic treatment of the powder is preferred, but not necessary. In addition, gettering agents may optionally be added to the thermal insulation system to getter moisture, hydrogen or other contaminants. Furthermore, opacifying agents such as metal flakes may optionally be added to further reduce radiant heat transfer. Some opacifying agents for use with various embodiments of the invention include copper or aluminum flakes.

Fill layer 120 has an application rate of powder suitable to generate a spacer layer 140 thickness of approximately 0.05 inches, in this embodiment, at a compression of powder of less than approximately 90%, and preferably in the range of approximately 1 to 90%. Compression values of the range of approximately 5 to 40% are further preferred. Compression is measured from the bulk density of the powder, which is the mass per unit volume of a solid particulate material as it is normally packed, with voids between particulates containing air. As an example, a unit volume of powder at its bulk density would have a compressed density 1.25 times its bulk density if compressed by 20%, i.e., compressed density=bulk density/(1−compression factor). For the above-mentioned compression values, compressed densities fall in the ranges of approximately 1 to 10 (compression values of less than 90%), from approximately 1.01 to 10 (compression values of 1 to 90%), and from approximately 1.05 to 1.67 (compression values of 5 to 40%).

Powders for use with various embodiments of the invention may have a bulk density in the range of approximately 0.2 to 10 $lb_m/ft^3$ Powders may further have a bulk density in the range of less than approximately 4 $lb_m/ft^3$ as well as in the range of approximately 2 to 4 $lb_m/ft^3$.

By way of illustration, typical values of the application rate would be approximately $2 \times 10^{-3}$ to $10 \times 10^{-3}$ $lb_m$ of powder per square foot of reflection layer 110 for powder materials having a bulk density of approximately 3.5 $lb_m/ft^3$. More preferred values range from approximately $4 \times 10^{-3}$ to $8 \times 10^{-3}$ $lb_m$ of powder per square foot of reflection layer 110 for such powder materials.

In general powders of the type described above will carry an electrostatic charge sufficient to be attracted to the foil or film of reflection layer 110. This attraction is generally more pronounced toward the dull surface of reflection layer 110, thus the powder will have a greater affinity for the dull surface. Accordingly, the dull surface of reflection layer 110 is preferably oriented toward fill layer 120. In FIG. 1, the surface of reflection layer 110 facing fill layer 120, i.e., the surface adjacent to fill layer 120, is the dull surface. The combination of mechanical compression and electrostatic effects tend to trap the powder between carrier layer 130 and reflection layer 110.

Carrier layer 130 is preferably a low thermal conductivity material. Preferred materials have a low density and a thickness of up to approximately 0.20 inches, more preferably in the range of 0.002 to 0.05 inches. Carrier layer 130 may optionally exceed a thickness of 0.2 inches. Examples of materials for carrier layer 130 include microglass paper or fabric, polyester fabric and Q-fiber fabric. Microglass paper and fabric are nonwoven materials produced using glass or ceramic fibers. Q-fiber fabric is a nonwoven material produced from an amorphous, fibrous silica material. In general the material of carrier layer 130 should have low loft, and contain small fibers or microfibers to minimize solid conduction of heat. Alternatively, as described in later embodiments, carrier layer 130 may be a reflection layer of an adjacent insulating layer.

Carrier layer 130 may have a width exceeding that of reflection layer 110. In one embodiment, carrier layer 130 extends beyond each edge of reflection layer 110. In another embodiment, carrier layer 130 extends one inch beyond each edge of reflection layer 110.

All materials in thermal insulation system 100 should have good vacuum compatibility to enhance performance at vacuum conditions. Accordingly, the materials of thermal insulation system 100 should have low outgassing characteristics. Additional considerations may take into account constraints of the environment in which thermal insulation system 100 is to be used or in which it may come in contact. As one example, if thermal insulation system 100 is used to insulate a liquid oxygen vessel the materials of thermal insulation system 100 may preferably have low reactivity to oxygen to minimize damage in the event of a failure of the vessel.

Figure 2:
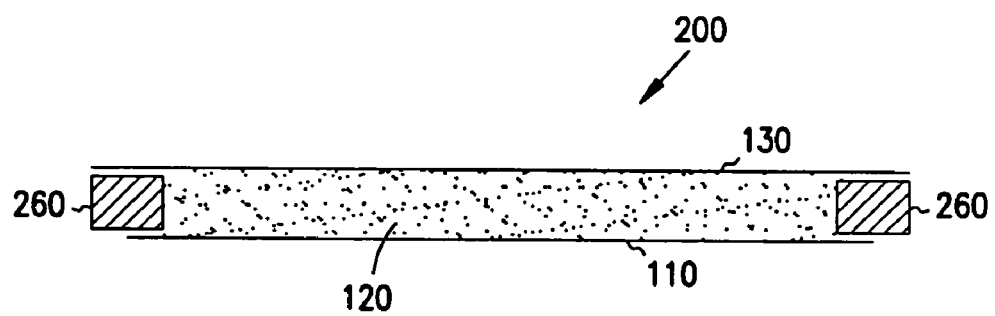
FIG. 2 is a thermal insulation system in accordance with another embodiment of the invention.

FIG. 2 shows an embodiment of a thermal insulation system 200. In FIG. 2, thermal insulation system 200 contains the reflection layer 110, fill layer 120 and carrier layer 130. Thermal insulation system 200 further contains edge strips 260. Edge strips 260 are preferably attached to reflection layer 110. Edge strips 260 may be attached to reflection layer 110 using glue, transfer adhesive, sonic welding or other attachment mechanism suitable to both components. Edge strips 260 may further be attached to carrier layer 130 in like fashion.

Edge strips 260 act as an additional barrier to keep the powder in place between carrier layer 130 and reflection layer 110. Edge strips 260 may further be utilized to control powder compression and to set the height of spacer layer 140. Edge strips 260 are preferably a material of low thermal conductivity. Examples may include Q-fiber felt, multilayer microglass paper or fabric, synthetic fabric or other fabric. In general edge strips include the same low-conductivity materials used for carrier layer 130.

Figure 3:
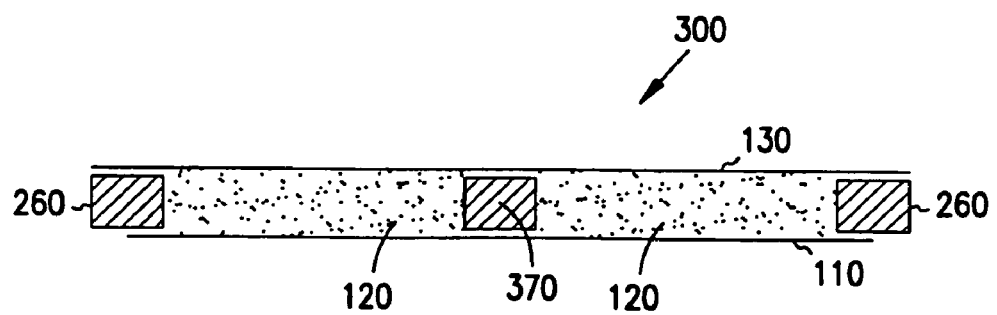
FIG. 3 is a thermal insulation system in accordance with yet another embodiment of the invention.

FIG. 3 is a further embodiment of a thermal insulation system 300. In FIG. 3, thermal insulation system 300 contains the reflection layer 110, fill layer 120, carrier layer 130 and edge strips 260. Thermal insulation system 300 further contains intermediate strips 370. Intermediate strips 370 may be utilized to provide further containment of powder when the distance between edge strips 260 is large. Further more, intermediate strips 370 may be utilized to aid in controlling powder compression in conjunction with edge strips 260. As an example of their use, intermediate strips 370 may be interposed midway between edge strips 260 when the distance between edge strips 260 exceeds four feet. Intermediate strips 370 would, as a convenience, have the same construction as edge strips 260.

There is no requirement that intermediate strips be spaced evenly between edge strips 260. Furthermore, more than one intermediate strip 370 may be interposed between edge strips 260. In addition, while intermediate strips 370 are preferably approximately parallel to edge strips 260, intermediate strips 370 may run at some other angle, such as producing diagonal or serpentine patterns. Intermediate strips 370 serve to divide fill layer 120 into sections, thereby separating adjacent sections.

Figure 4:
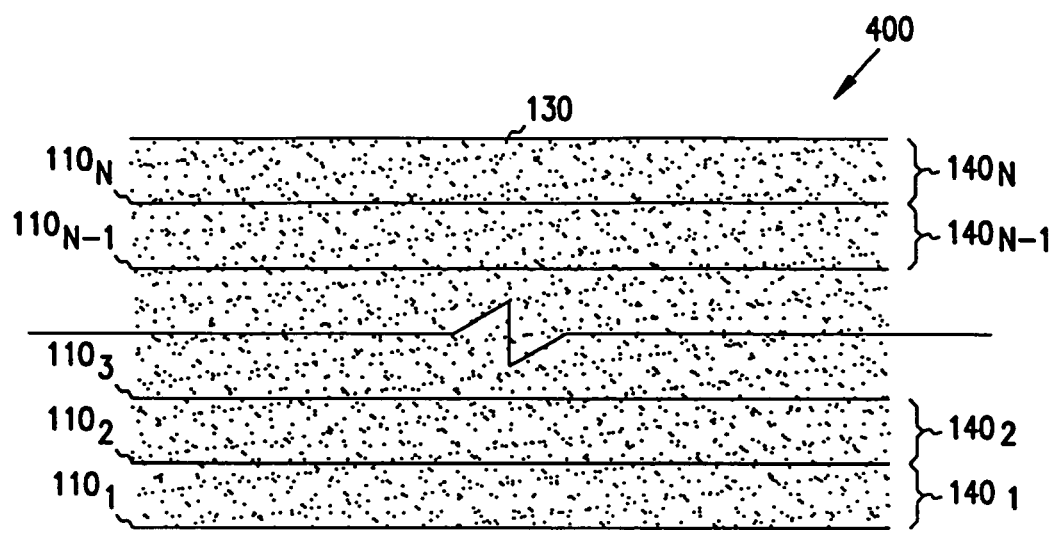
FIG. 4 is a multilayered thermal insulation system in accordance with one embodiment of the invention.

FIG. 4 is another embodiment of a thermal insulation system 400. In FIG. 4, thermal insulation system 400 is a multilayer system having multiple reflection layers 110 and spacer layers 140 in an alternating pattern, each reflection layer/spacer layer combination forming an insulating layer. In one embodiment, spacer layer $140_n$ contains a fill layer 120 and a carrier layer 130, while intermediate spacer layers $140_1$ through $140_{n-1}$ contain a fill layer 120 such that the $i^{th}+1$ reflection layer serves as the carrier layer for the adjacent $i^{th}$ fill layer. This embodiment results in a repeating pattern of reflection layer/fill layer with the final fill layer having a carrier layer. In another embodiment, each spacer layer contains a fill layer 120 and a carrier layer 130, resulting in a repeating pattern of reflection layer/fill layer/carrier layer. The number of insulating layers employed in thermal insulation system 400 may typically be in the range of approximately 5 to 50, although the number of insulating layers is dependent upon the desired insulation characteristics or other external constraints, such as cost or space (total thickness) considerations. Other typical installations may contain approximately 10 to 20 insulating layers. Additional layers will tend to lower the heat loss through the thermal insulation system 400, but generally the marginal improvement at some point will not justify the additional cost. Although not shown in FIG. 4, thermal insulation system 400 may utilize edge strips 260 or intermediate strips 370 as shown in FIGS. 2 and 3, respectively.

Figure 5:
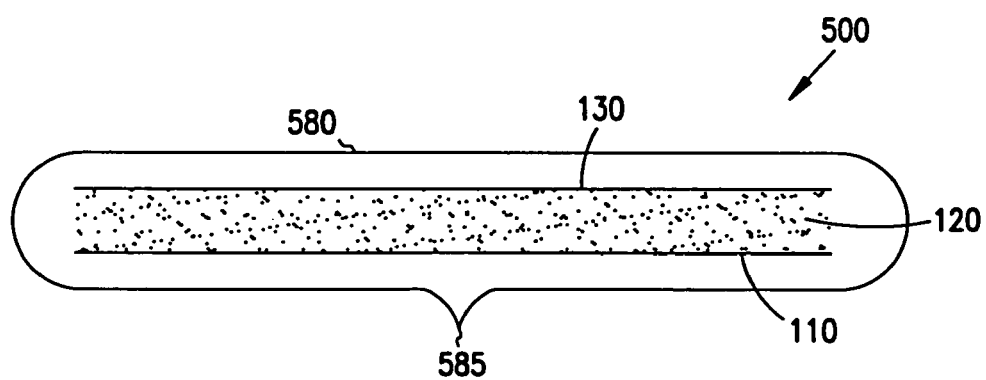
FIG. 5 is a thermal insulation system with outer casing in accordance with one embodiment of the invention.

FIG. 5 is one embodiment of a thermal insulation system 500 having an outer casing 580. Thermal insulation system 500 may contain a single-layer system as described with reference to FIGS. 1–3, or a multilayer system as described with reference to FIG. 4. Outer casing 580 is preferably a breathable medium having a sufficiently low pore size to permit removal of gases within outer casing 580 yet entrap particles of the powder of the one or more fill layers. Optionally, outer casing 580 may be an impermeable medium such as plastic sheet.

Outer casing 580 as a breathable medium offers enhanced performance when utilizing vacuum pumps to create an evacuated space surrounding the thermal insulation system. By acting as a filtration medium for the particles of powder, outer casing 580 reduces or eliminates fouling of the vacuum pumps. If the pore size of outer casing 580 is too small, however, evacuation of the surrounding space may lead to rupture of outer casing 580 if too great a pressure differential is created before the gases within outer casing 580 have a chance to escape. Outer casing 580, in either form, may further provide ease of handling and transport.

Outer casing 580 is shown to be formed from one layer of material having one seam 585 located below reflection layer 110. There is no requirement that outer casing 580 be formed of one layer of material nor that the seam be located below reflection layer 110. However, if acting as a filter medium, minimization of the number of seams is preferred. Furthermore, location of the seam away from the edges of the single or multilayer system reduces heat loss due to edge effects and may further inhibit release of particles of powder.

Figure 6A:
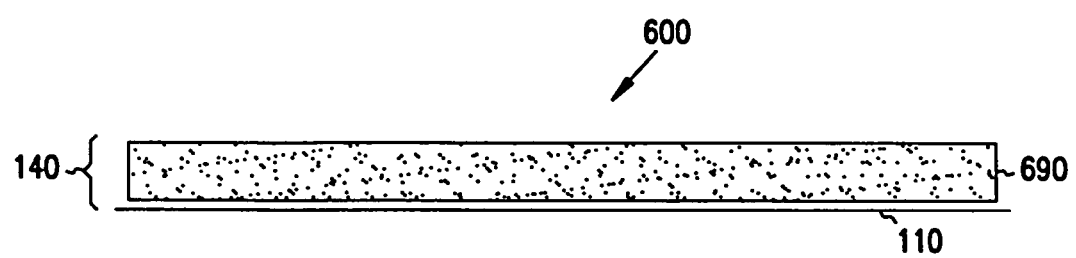
FIGS. 6A–6B are thermal insulation systems having a powder-containing support in accordance with the invention.

As an alternative to a fill layer construction of unsupported powder as depicted in FIGS. 1–3, the powder may be contained within carrier layer 130. FIG. 6A shows one example of a thermal insulation system 600 having a reflection layer 110 and spacer layer 140, where spacer layer 140 contains a carrier layer 690 having powder mechanically injected into the material of the carrier layer. Materials for carrier layer 690 include the constructions disclosed for carrier layer 130. Such structures contain pores or other open spaces to hold the powder. Mechanical injection may include creating a vacuum on one side of carrier layer 690 to suction powder into the open spaces, or may include forcing the powder into carrier layer 690 using pressure. Powder may further be mechanically injected into carrier layer 690 through vibratory or other mechanical means. With the powder held within carrier layer 690, carrier layer 690 is essentially a superimposition of carrier layer 130 and fill layer 120.

Figure 6B:
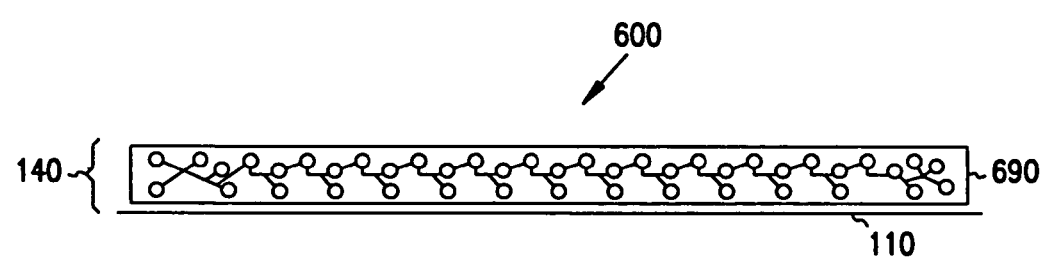

FIG. 6B shows another example of thermal insulation system 600, but where spacer layer 120 contains carrier layer 690 having powder chemically formed within carrier layer 690. An example would include sol-gel technology, such as tetramethylorthosilicate hydrolyzed in methanol such that the gel is inserted into the pores of carrier layer 690 and the solvent removed under supercritical conditions to leave the aerogel structure embedded in carrier layer 690. For either embodiment of FIGS. 6A–6B, such spacer layers 140 can be incorporated into thermal insulation systems as described with reference to FIGS. 1–5. It should be noted that edge strips and intermediate strips become redundant in the embodiments described with reference to FIGS. 6A–6B, as carrier layer 690 provides such functionality.

Figure 7:
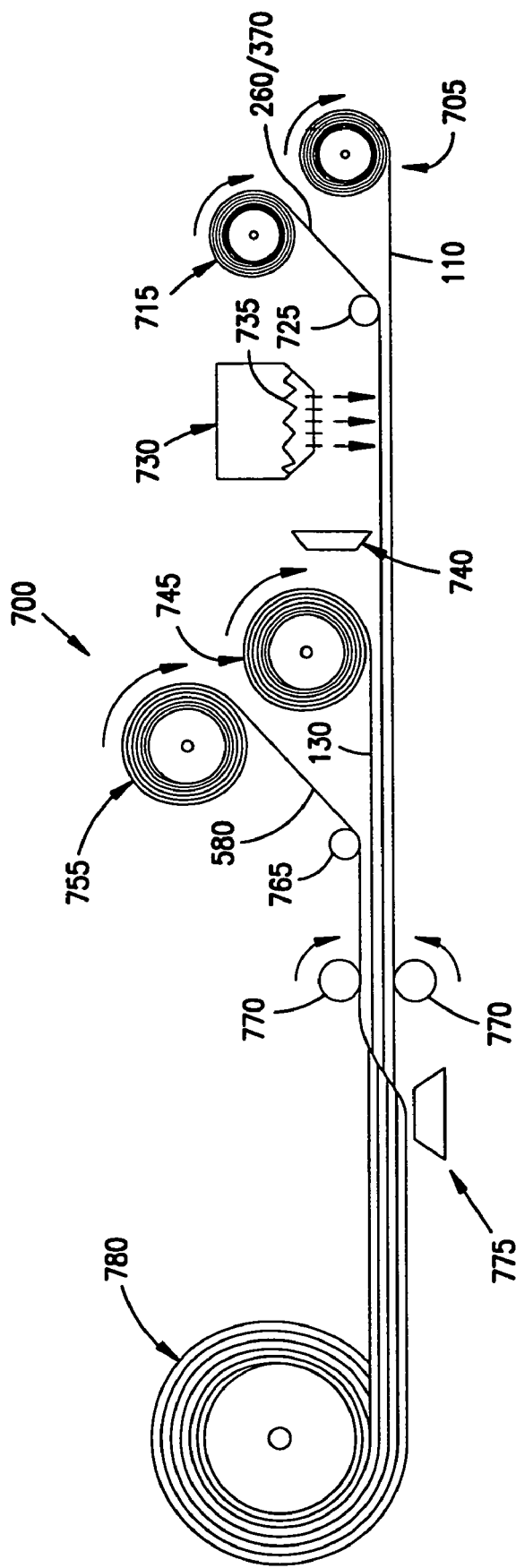
FIG. 7 is a fabrication system in accordance with an embodiment of the invention.

FIG. 7 is a schematic of equipment adapted to produce thermal insulation systems of the invention on a continuous basis in accordance with one embodiment of a fabrication method. Fabrication system 700 includes a reflection layer feed roll 705, strip feed roll 715, idler 725, powder hopper 730, rake 740, carrier layer feed roll 745, outer casing feed roll 755, idler 765, compression rollers 770, seamer 775 and take-up spool 780.

In one embodiment, reflection layer 110 is fed from reflection layer feed roll 705 with its dull surface facing upward. Edge strips 260 (and/or intermediate strips 370) are fed from strip roll 715. Edge strips 260 are contacted with reflection layer 110 by idler 725 and may be attached to reflection layer 110 through the application of glue, adhesive or other attachment mechanism at this point. Powder hopper 730 is used to distribute powder 735 onto the reflection layer 110 at a first application rate, equal to or exceeding the desired application rate. The desired application rate is a rate sufficient to produce a desired thickness of a spacer layer, as described in the earlier embodiments, following compression. Powder hopper 730 may be a vibratory powder feeder. Alternatively, powder 735 may be screw fed or conveyed onto reflection layer 110. Regardless of the mechanism, powder 735 is deposited on the reflection layer 110 at or exceeding the desired application rate.

The powder 735 may be periodically or continuously heat treated to remove adsorbed moisture. The heat treatment may be a function of powder hopper 730. Alternatively, powder 735 may be heat treated prior to being supplied to powder hopper 730. In this case, however, powder hopper 730 should be sufficiently sealed or purged to avoid intake of moisture and contamination of powder 735.

Rake 740 can be used to remove excess powder 735, leaving powder distributed across the reflection layer 110 at a second, or desired, application rate. In addition, if powder 735 is not evenly distributed across the surface of reflection layer 110, rake 740 can be used to redistribute powder 735 to evenly cover reflection layer 110 at the desired application rate. Rake 740 may be eliminated if sufficient control is exercised on the distribution and application rate of powder 735 across the surface of reflection layer 110. Excess powder 735 removed by rake 740 may be recycled back to powder hopper 730.

Carrier layer 130 is applied on the layer of powder 735 from carrier feed roll 745. Outer casing 580 is applied on the carrier layer 130 from outer casing feed roll 755 and contacted to carrier layer 130 with idler 765. While it is not shown in the drawings, it should be apparent that outer casing 580 is approximately twice as wide as the widest of reflection layer 110 and carrier layer 130. The extra width of outer casing 580 permits it to be wrapped around reflection layer 110 and carrier layer 130 and seamed by seamer 775 to form the casing around the single or multilayer system of the thermal insulation system. As an alternative, outer casing 580 may contain two layers seamed together on their outer edges. However, as discussed with reference to FIG. 5, this is not a preferred construction. As a further alternative, outer casing 580 may have a width greater than the width of the widest of reflection layer 110 and carrier layer 130, where the edges of outer casing 580 are simply lapped around the edges of reflection layer 110 and carrier layer 130 and held by some appropriate fastening means or by some further support layer.

Compression rollers 770 may serve to control the linear speed of the fabrication system 700, pulling the various layers through the fabrication system 700, with the various feed rolls clutched to maintain tension. If application of powder 735 is automatically controlled, the feed rate can be a function of the speed of compression rollers 770. Compression rollers 770 serve to compress the layers of the thermal insulation system together, thus compressing the powder contained between the various layers.

It will be apparent to those skilled in the art that additional feed rolls and systems of feeding and distributing powder may be added to fabrication system 700 to fabricate multilayer thermal insulation systems. Of course, the appropriate order to produce the repeating pattern of reflection layer and spacer layer should be used. As an example, the section 790 of fabrication system 700 may be repeated and inserted between carrier layer feed roll 745 and rake 740 to produce a two-layer system construction of two reflection layer/spacer layer combinations. In addition, outer casing feed roll 755, seamer 775 and outer casing 580 may be eliminated to produce single and multilayer thermal insulation systems without an outer casing.

Prior to taking up the resulting thermal insulation system on take-up spool 780, an additional seaming operation may be performed tangential to the direction of process flow to produce a lateral seam. The lateral seam may serve to limit loss of powder from the fill layer should the reflection layer or carrier layer fail. Using a series of lateral seams to create sections within the spool of thermal insulation system will limit loss of the fill layer to the section experiencing the failure. Used in conjunction with edge strips and intermediate strips, lateral seams produce a matrix of sections within the thermal insulation system to limit a single instance of insulation failure to one section within the matrix. Such segmentation further serves to eliminate the spiral path of solid conduction heat transfer through highly conductive reflection layers.

Figure 8A:
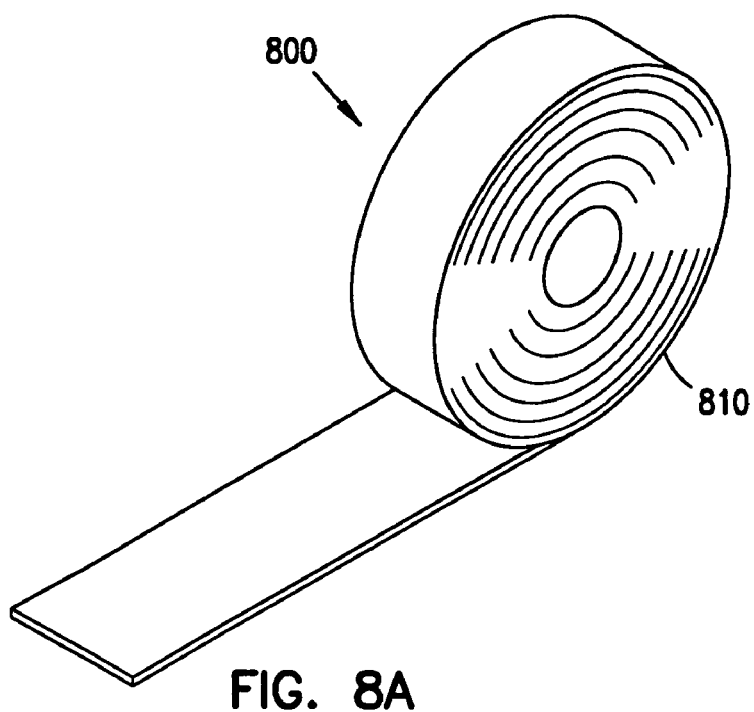
FIGS. 8A–8D are example formats of thermal insulation systems in accordance with various embodiments of the invention.

Thermal insulation systems 800 produced in accordance with the invention may be produced in rolls 810 as depicted in FIG. 8A. It is preferred that the thermal insulation system be protected from moisture and other contamination by packaging it in a purged impermeable container, e.g., a plastic bag purged with dry nitrogen gas.

Figure 8B:
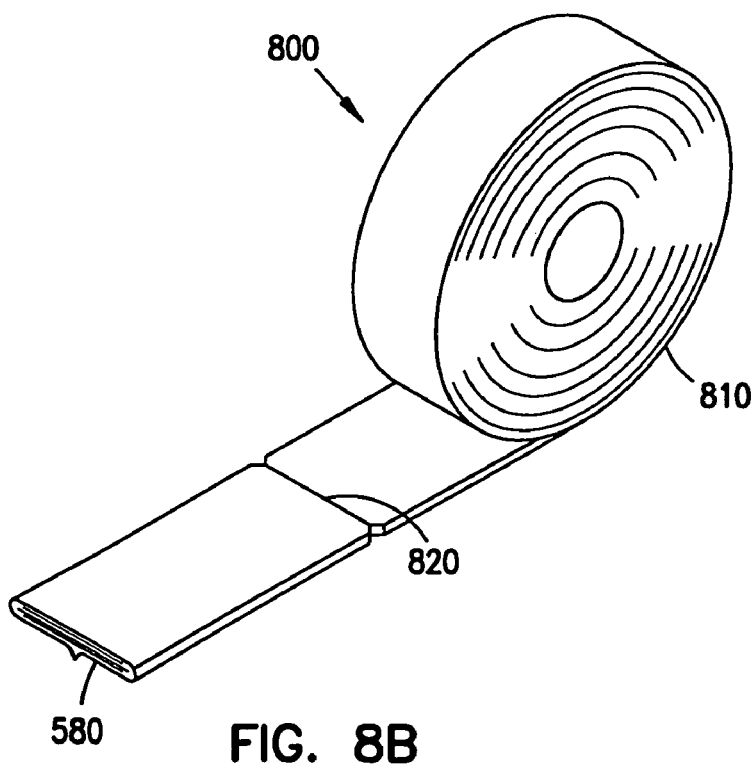
Figure 8C:
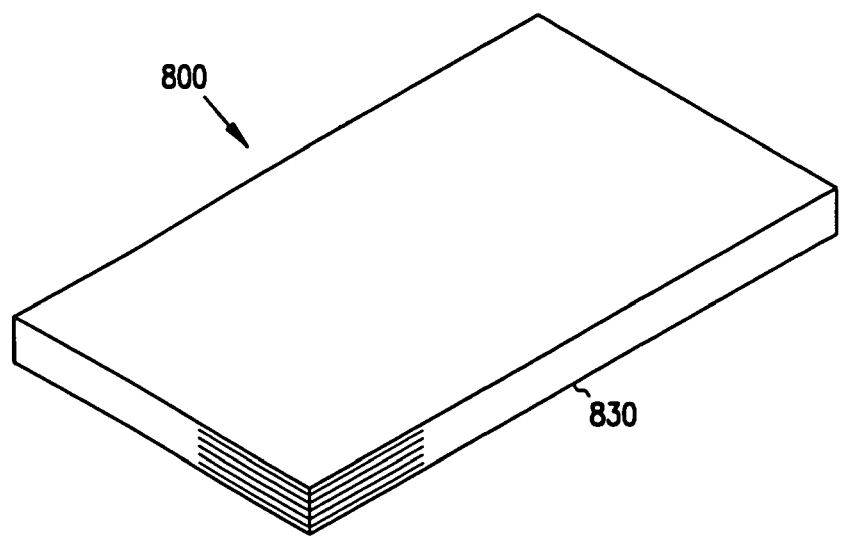
Figure 8D:
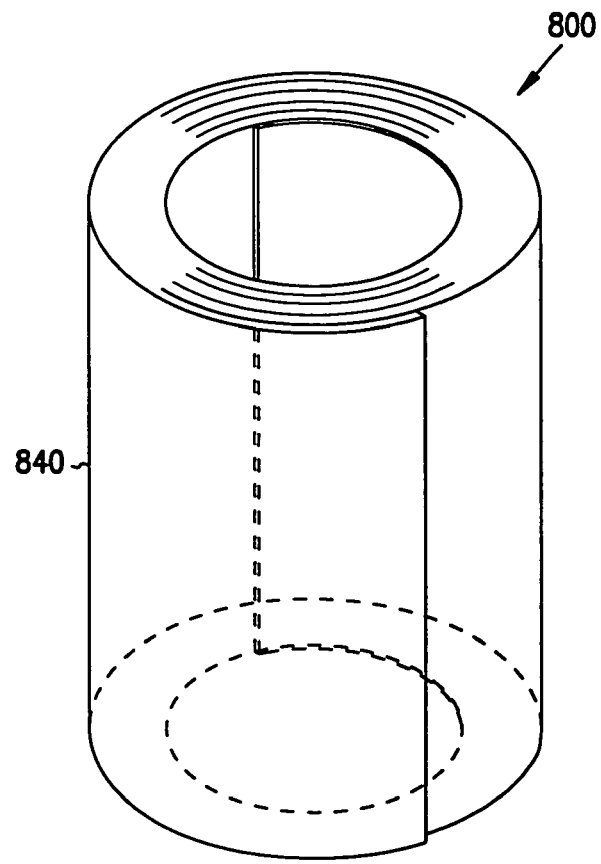

FIG. 8B depicts an embodiment of thermal insulation system 800 having an outer casing 580 and showing a lateral seam 820. Additional lateral seams (not shown) may be spaced intermittently along the length of roll 810, as well as at the beginning and end of roll 810. FIG. 8C depicts an embodiment of thermal insulation system 800 produced as a blanket 830. Because the fill layer serves to separate a reflection layer from a carrier layer or other reflection layers in a manner distinct from typical MLI, thermal insulation systems having flexible insulating layers in accordance with the invention may be preformed to convenient shapes without significant loss of performance characteristics. FIG. 8D depicts an embodiment of thermal insulation system 800 preformed as a sleeve 840, common in the insulation of piping systems. Sleeve 840 may be formed from a blanket 830 or roll 810 by seaming one or more pieces together. It is further expected that given the affinity of the powder to remain in place due to electrostatic effects, one or more blankets 830 may be used to form dome structures (not shown) or other three-dimensional preforms. Sleeve 840 is preferably mounted on a removable rigid liner, often thin plastic sheet. Such removable liners aid in installation as is understood in the art, and should be removed upon installation.

In addition to the fabrication methods described with reference to FIG. 7, other methods of fabrication, both batch and continuous, may be defined with reference to the various embodiments of thermal insulation systems described herein.

Thermal insulation systems in accordance with the invention may be used to insulate any object. Thermal insulation systems in accordance with the invention are particularly suited to cryogenic applications. In such installations, thermal insulation systems of the invention should be applied with the dull surface of the reflection layer facing the colder side, e.g., a storage tank for liquid nitrogen. Thermal insulation systems of the invention should be installed in an annular space capable of maintaining a vacuum such that the thermal insulation system itself is maintained at operating pressures below atmospheric. For storage and transportation prior to installation, thermal insulation systems should be protected from contamination by placing them in a purged impervious liner or container. If a hermetically-sealed liner, such as a sealed, flexible plastic enclosure is used, the thermal insulation system can be installed without removing the liner. Such installations may be desirable where contamination after installation is a concern.

Thermal insulation systems of the invention may be utilized in all operating pressures. The thermal insulation systems may be utilized in high vacuum applications (below about $1 \times 10^{-4}$ torr), soft vacuum applications (about 1 to 10 torr), reduced atmospheric applications (about 10 to 50 torr) and near-ambient pressure applications (about 50 to 760 torr). Operating pressures are preferably less than approximately 50 torr. Operating pressures may be in the range of approximately 1 torr to 10 torr. While there is no restriction that thermal insulation systems of the invention be used at or below atmospheric pressures, higher pressures may begin to compress the layers of the thermal insulation system if installed in a hermetically-sealed liner, and thus increase the thermal conductivity of such systems.

Operating temperatures for thermal insulation systems of the invention are more constrained by the chosen materials of construction. For example, use of organic materials, e.g., plastics, may restrict both upper and lower operating limits to avoid decomposition, cracking or other temperature-related failure. Provided appropriate material constraints are taken into consideration, operating temperatures of approximately 4K (−452° F.) to 480K (+400° F.) may be considered typical. Thermal insulation systems of the invention may further find application in the range of approximately 77K (−320° F.) to 295K (+70° F.).

Some specific examples of commercial low-temperature applications include the insulation of superconducting power transmission cables and equipment, storage, transfer and transportation systems for liquid cryogens, space launch vehicle propellant tanks and feed lines, industrial refrigeration units and other thermal storage devices. Additional examples include food processing, medical equipment, manufacturing and other cryogenic applications. Higher temperature applications include systems for the use, transfer and transportation of carbon dioxide, ammonia, chilled water or brine, oil and steam, as well as other applications for medium-high temperature gases, vapors or liquids.

Thermal insulation systems produced in accordance with various embodiments of the invention have been demonstrated to have k values of approximately 0.09 mW/m-K (R-value of approximately 1600) at high vacuum while still maintaining k values of approximately 2.4 mW/m-K (R-value of approximately 60) at 1 torr, each on the basis of one inch of insulation and the boundary conditions of 77K to 290K. Such performance is substantially similar to MLI systems at high vacuum under laboratory conditions, and several times better (often 3 to 4 times) at soft vacuums of about 1 to 10 torr. In addition, through improved separation of reflection layers, performance of thermal insulation systems of the invention may exceed MLI systems under conditions of actual use at high vacuum, recalling that MLI is prone to failure due to mechanical compression, edge effects and handling. Thermal insulation systems of the invention further provide performance improvements over bulk-filled insulation systems at soft or high vacuum.

Comparative studies of MLI and thermal insulation systems of the invention show that similar insulative properties can be obtained at high vacuum levels, while superior results are achieved at soft vacuum levels. The following Table 1 shows the values obtained with a typical MLI system (aluminum, foil and fiberglass paper, 40 layers) having about 46 layers per inch in comparison with three thermal insulation systems of the invention (#1, #2 and #3) having about 18 layers per inch and a fill layer of fumed silica. Variations within thermal insulation systems #1, #2 and #3 are expected due to differing final densities of powder.

TABLE 1

Comparative Study of Thermal Conductivity as a Function of Cold Vacuum Pressure

| Pressure (microns Hg) | MLI | #1 | #2 | #3 |
|---|---|---|---|---|
| 0.05 | | 0.09 | | |
| 0.07 | | | | 0.17 |
| 0.11 | | | 0.13 | |
| 0.13 | | | | 0.15 |
| 0.26 | 0.08 | | | |
| 0.27 | | | | 0.17 |
| 0.30 | | | | |
| 1 | | 0.10 | 0.18 | 0.12 |
| 10 | | 0.49 | 0.49 | 0.61 |
| 100 | | 2.68 | 1.23 | 1.34 | 1.11 |
| 958 | | | | |
| 982 | | | 2.93 | |
| 998 | | | 2.60 | |
| 1000 | 9.49 | | | |
| 1005 | | | | 2.66 |
| 5020 | | | | 4.74 |
| 10000 | 20.00 | | | |
| 10003 | | | 7.71 | |
| 10007 | | | | 6.82 |
| 10012 | | 6.07 | | |
| 99730 | | 10.68 | | |
| 100160 | 30.00 | | | |

Through the combination of definition of the carrier layer, the reflection layer and powders for use in the spacer layer, and the subsequent compression of the powder in the spacer layer, thermal insulation systems of the invention provide insulation properties that are unexpected from that of bulk fill systems and other powder-containing systems.

CONCLUSION

Thermal insulation systems have been described along with methods of their production. The thermal insulation systems incorporate at least one reflection layer and at least one spacer layer in an alternating pattern. Each spacer layer includes a fill layer and a carrier layer. The fill layer may be separate from the carrier layer, or it may be a part of the carrier layer, i.e., mechanically injected into the carrier layer or chemically formed in the carrier layer. Fill layers contain a powder having a high surface area and low bulk density. Movement of powder within a fill layer is restricted by electrostatic effects with the reflection layer combined with the presence of a carrier layer, or by containing the powder in the carrier layer. The powder in the spacer layer may be compressed from its bulk density. The thermal insulation systems may further contain an outer casing. Thermal insulation systems may further include strips and seams to form a matrix of sections. Such sections serve to limit loss of powder from a fill layer to a single section and reduce heat losses along the reflection layer.

Although specific embodiments have been illustrated and described herein, it will be appreciated by those of ordinary skill in the art that any arrangement which is calculated to achieve the same purpose may be substituted for the specific embodiments shown. Many adaptations of the invention will be apparent to those of ordinary skill in the art. As an example, other materials, equivalent to those used in the example embodiments in their properties, may be utilized in accordance with the invention. Accordingly, this application is intended to cover any adaptations or variations of the invention. It is manifestly intended that this invention be limited only by the following claims and equivalents thereof.

What is claimed is:

1. A thermal insulation system, comprising:
at least one flexible insulating layer, wherein said at least one flexible insulating layer is conformable to three-dimensional surfaces of an object to be insulated, and comprises:
a reflection layer having a first surface and second surface and formed of a material selected from a group consisting of metal foils and metalized foils;
a carrier layer formed of a low thermal conductivity material selected from a group consisting of microglass, paper, fabric, polyester fabric and Q-fiber fabric; and
a fill layer located between and contacting both the carrier layer and the first surface of the reflection layer; said fill layer containing powder having a compressed density of approximately 1 to 10 times a bulk density of the powder.

2. The thermal insulation system of claim 1, wherein the powder has a surface area of approximately 10 to 1,100 $m^2$/g of powder.

3. The thermal insulation system of claim 1, wherein the bulk density of the powder is less than approximately 4 $lb_m/ft^3$.

4. The thermal insulation system of claim 1, wherein the powder is a silica selected from the group consisting of fumed silica and silica aerogel.

5. The thermal insulation of claim 1, wherein a combination of said fill layer and said carrier layer has a thickness of approximately 0.002 to 0.20 inches.

6. The thermal insulation system of claim 1, further comprising:
an outer casing surrounding the at least one flexible insulating layer.

7. The thermal insulation system of claim 1, wherein the k value of the thermal insulation system is approximately 0.09 mW/m-K at below about $1 \times 10^{-4}$ torr and approximately 2.4 mW/m-K at approximately 1 torr, for insulation having an approximately one inch thickness and boundary conditions of 77K and 290K.

8. A thermal insulation system, comprising:
a plurality of similarly constructed, adjacently disposed flexible insulating layers, wherein each of said plurality of flexible insulating layers is conformable to three-dimensional surfaces of an object to be insulated, wherein each flexible insulating layer comprises:

a reflective layer, having a first surface and second surface and formed of a material selected from a group consisting of metal foils and metalized foils, a carrier layer formed of a low thermal conductivity material selected from a group consisting of microglass, paper, fabric, polyester fabric and Q-fiber fabric;

a fill layer interposed between and contacting both the carrier layer and the reflective layer, wherein the fill layer only contains powder having a compressed density of approximately 1 to 10 times a bulk density of the powder; and at least one edge strip adjacent to each fill layer and interposed between each carrier layer and adjacent reflection layer.

9. The thermal insulation of claim 8, further comprising: said at least one intermediate strip interposed between the carrier layer and the reflection layer separates sections of the fill layer.

10. The thermal insulation system of claim 8, further comprising:
an outer casing surrounding the at least one flexible insulating layer.

11. The thermal insulation system of claim 8, wherein the carrier layer or a first flexible insulating layer is the reflection layer of an adjacent flexible insulating layer.

12. The thermal insulation system of claim 8, wherein each combination of a fill layer and its adjacent carrier layer has a thickness of approximately 0.002 to 0.20 inches.

13. The thermal insulation system of claim 8, wherein the k value of the thermal insulation system is approximately 0.09 mW/m-K at below about $1 \times 10^{-4}$ torr and approximately 2.4 mW/m-K at approximately 1 torr, for insulation having an approximately one inch thickness and boundary conditions of 77K and 290K.

* * * * *